(12) United States Patent
Omae

(10) Patent No.: US 10,661,246 B2
(45) Date of Patent: May 26, 2020

(54) LIGHT IRRADIATION DEVICE

(71) Applicant: USHIO DENKI KABUSHIKI KAISHA, Tokyo (JP)

(72) Inventor: Yasushi Omae, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/314,225

(22) PCT Filed: Jun. 2, 2017

(86) PCT No.: PCT/JP2017/020588
§ 371 (c)(1),
(2) Date: Dec. 28, 2018

(87) PCT Pub. No.: WO2018/008308
PCT Pub. Date: Jan. 11, 2018

(65) Prior Publication Data
US 2019/0151819 A1 May 23, 2019

(30) Foreign Application Priority Data
Jul. 5, 2016 (JP) ................. 2016-133295

(51) Int. Cl.
*B01J 19/12* (2006.01)
*B05D 3/06* (2006.01)
(Continued)

(52) U.S. Cl.
CPC ............ *B01J 19/123* (2013.01); *B05D 3/067* (2013.01); *B29C 35/10* (2013.01); *H01B 13/003* (2013.01);
(Continued)

(58) Field of Classification Search
CPC .......... B01J 19/123; B05D 3/061; B29C 35/10
See application file for complete search history.

(56) References Cited

U.S. PATENT DOCUMENTS 4,464,707 A * 8/1984 Forrest ................... F21S 8/036
362/217.06
4,504,768 A * 3/1985 Ury ....................... H01J 65/044
313/611
(Continued)

FOREIGN PATENT DOCUMENTS

JP 2892545 B2 5/1999
JP 5851837 B2 2/2016

OTHER PUBLICATIONS

International Search Report issued in PCT/JP2017/020588; dated Jul. 25, 2017.

*Primary Examiner* — Nicole M Ippolito
*Assistant Examiner* — Sean M Luck
(74) *Attorney, Agent, or Firm* — Studebaker & Brackett PC

(57) ABSTRACT

A light irradiation device includes a protective tube, which has a wire insertion path therein, a light source unit facing and disposed along an upper part of the protective tube, and a gutter-shaped concave reflection mirror facing the light source unit and provided below the protective tube. The concave reflection mirror is received in a gutter-shaped concave accommodating part provided in a holding body, and has flange portions extending from the outer surface in the horizontal direction. The convex reflection mirror is detachably affixed to the holding body with the flange portions.

4 Claims, 4 Drawing Sheets

(51) Int. Cl.
*B29C 35/10* (2006.01)
*H01J 61/00* (2006.01)
*H01B 13/00* (2006.01)

(52) U.S. Cl.
CPC ....... *H01J 61/00* (2013.01); *B01J 2219/0873* (2013.01); *B05D 2256/00* (2013.01)

(56) References Cited

U.S. PATENT DOCUMENTS

| | | | | |
|---|---|---|---|---|
| 4,710,638 A * | 12/1987 | Wood | ...................... | F26B 3/28 |
| | | | | 250/492.1 |
| 4,841,422 A * | 6/1989 | Groh | .................. | F21V 19/0005 |
| | | | | 362/294 |
| 4,866,329 A * | 9/1989 | Ferenc | ................. | B60Q 1/2611 |
| | | | | 313/113 |
| 4,872,099 A * | 10/1989 | Kelley | .................... | B60Q 3/82 |
| | | | | 362/295 |
| 4,930,054 A * | 5/1990 | Krebs | .................... | F21S 8/026 |
| | | | | 362/149 |
| 4,985,814 A * | 1/1991 | Lyons | .................... | B60Q 1/2607 |
| | | | | 362/240 |
| 5,294,260 A * | 3/1994 | Larsen-Moss | ......... | B01J 19/123 |
| | | | | 118/420 |
| 5,861,633 A * | 1/1999 | Mandellos | .............. | F21V 7/005 |
| | | | | 250/504 R |
| 6,242,717 B1 * | 6/2001 | Sanderson | .............. | C03C 25/12 |
| | | | | 219/388 |
| 6,306,010 B1 * | 10/2001 | West | ...................... | B24C 1/045 |
| | | | | 451/36 |
| 6,511,715 B2 * | 1/2003 | Rhoades | ................ | B05D 3/067 |
| | | | | 427/385.5 |
| 6,626,561 B2 * | 9/2003 | Carter | ...................... | F26B 3/28 |
| | | | | 250/455.11 |
| 6,841,790 B1 * | 1/2005 | Phillips | ................. | H01J 65/044 |
| | | | | 250/492.1 |
| 7,923,706 B2 | 4/2011 | Brassell et al. | | |
| 8,507,884 B2 * | 8/2013 | Swain | ..................... | H01J 61/32 |
| | | | | 250/493.1 |
| 2004/0239243 A1 * | 12/2004 | Roberts | ..................... | B60L 1/14 |
| | | | | 313/512 |
| 2006/0022154 A1 * | 2/2006 | Schmitkons | .............. | G01J 3/10 |
| | | | | 250/495.1 |
| 2009/0273932 A1 * | 11/2009 | Wood | ...................... | F26B 3/28 |
| | | | | 362/297 |
| 2009/0278461 A1 * | 11/2009 | Lee | .......................... | F21V 29/76 |
| | | | | 315/112 |
| 2010/0084574 A1 * | 4/2010 | Brassell | ................. | B29C 71/04 |
| | | | | 250/492.1 |
| 2011/0305027 A1 * | 12/2011 | Ham | ...................... | F21V 15/01 |
| | | | | 362/368 |
| 2013/0155685 A1 * | 6/2013 | Stanley | ..................... | F21V 7/00 |
| | | | | 362/294 |
| 2015/0108370 A1 * | 4/2015 | Gunter | .................... | B05D 3/06 |
| | | | | 250/492.1 |
| 2015/0123015 A1 * | 5/2015 | Bachman | .............. | H01J 65/044 |
| | | | | 250/492.1 |

* cited by examiner ions are made integrally
LIGHT IRRADIATION DEVICE

TECHNICAL FIELD

The present invention relates to a light irradiation device that emits light toward a wire, and more particularly a light irradiation device for hardening resin on a surface of the wire.

BACKGROUND ART

Conventionally, a light irradiation device that irradiates a wire with ultraviolet light to harden a resin coating on the outer surface of the wire and/or reform the surface of the wire is known. In a process for manufacturing an optical fiber, for example, the resin coating is applied on the outer surface of an optical fiber to form a protective film on the outer surface of the optical fiber.

For example, as shown in FIG. 8 of the accompanying drawings, Japanese Patent No. 5851837 (Patent Literature Document 1) discloses a light irradiation device that directs light, which is emitted from a discharge lamp, around the wire by a reflection mirror. In this light irradiation device, a discharge lamp 101 is placed at a first focal point of a light converging (condensing) reflection mirror 102, and a wire 104 that extends in a protective tube 103 arranged at a position facing the discharge lamp is placed at a second focal point. With such configuration, the ultraviolet light from the discharge lamp 101 is reflected and converged by the light converging reflection mirror 102 such that the wire 104 extending in the protective tube 103 is irradiated with the ultraviolet light to harden the wire 104 with the light.

In this prior art technology, there is a problem that the coating material applied on the wire flies during conveyance, and the coating material stains and/or contaminates the protective layer that is arranged around the wire. If the protective tube is stained and/or contaminated, a problem arises, i.e., the light to be directed to the wire is attenuated, and it becomes difficult to efficiently irradiate the wire with the light for the hardening. To address this problem, it is necessary to replace the protective tube with a new protective tube at regular intervals. However, if the reflection mirror is scratched and/or contaminated during the protective tube replacement work, this would deteriorate the reflectance.

When manufacturing the reflection mirror, a metal block material undergoes a mirror-finishing process. The above-mentioned replacement work of the protective tube inevitably damages the reflection mirror.

Japanese Patent No. 2892545 (Patent Literature Document 2) teaches that a reflection mirror is made integrally with a reflection mirror holding body, and the reflection mirror is removed together with the reflection mirror holding body. This configuration, however, entails a problem that the thickness of the reflection mirror becomes small, and the reflection mirror deforms due to thermal expansion. If the curvature of the reflection mirror changes due to the thermal expansion, a problem arises, i.e., the focal point shifts from a designed point, and this makes it difficult to efficiently harden the wire.

LISTING OF REFERENCES

Patent Literature Documents

Patent Literature Document 1: Japanese Patent No. 5851837

Patent Literature Document 2: Japanese Patent No. 2892545

SUMMARY OF THE INVENTION

Problems to be Solved by the Invention

In view of the above-described problems of the prior art technologies, an object of the present invention is to provide a light irradiation device that directs light, which is emitted from a light source, toward an interior of a protective tube, and causes the light passing through the protective tube to be reflected by a concave reflection mirror placed at a position facing the protective tube such that the reflected light proceeds to the interior of the protective tube and a wire in the protective tube is irradiated with the light. The concave reflection mirror is detachable such that a replacement work for the concave reflection mirror becomes easy, and deformations of the concave reflection mirror due to thermal expansion are reduced to minimum.

Solution to the Problems

To achieve the above-mentioned object, a light irradiation device according to one aspect of the present invention includes a concave reflection mirror that surrounds a protective tube, the concave reflection mirror is received in a concave accommodating portion formed in a holding body, the concave accommodating portion has a gutter shape, and the concave reflection mirror has flange portions that extend horizontally from an outer surface of the concave reflection mirror. The concave reflection mirror is detachably fixed to the holding body with the flange portions.

The reflection mirror may have protruding portions that protrude upward beyond the flange portions.

The protruding portions of the reflection mirror may define a maximum outer diameter portion that is greater than an opening width of the concave accommodating portion, and the flange portions may be formed below the maximum outer diameter portion.

A heat conductive sheet may be disposed between the reflection mirror and the holding body.

Advantageous Effects of the Invention

The light irradiation device of the present invention has the concave reflection mirror received in the concave accommodating portion of the holding body, and the horizontally extending flange portions are used to detachably fix the concave reflection mirror to the holding body. Therefore, the prevent invention provides the following advantages. The attaching and detaching of the concave reflection mirror is easy. Also, because the flange portions are used for the fixing of the concave reflection mirror, the deformations of the concave reflection mirror due to the thermal influences are prevented, and it is possible to carry out the light irradiation in an efficient manner.

When the concave reflection mirror has protruding portions that upwardly protrude toward the light source beyond the flange portions, the ultraviolet light from the light source is efficiently reflected toward the protective tube for effective use of the ultraviolet light.

When the flange portions are formed below the maximum outer diameter portion of the concave reflection mirror, the attaching of the concave reflection mirror to the concave accommodating portion of the holding body is easy.

DESCRIPTION OF EMBODIMENTS

Figure 1:
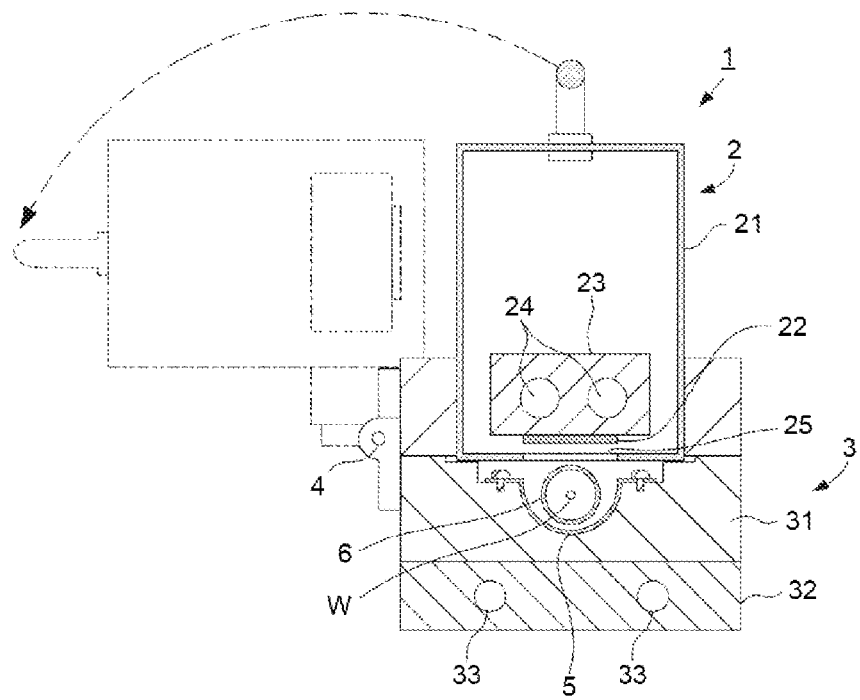
FIG. 1 illustrates a cross-sectional view of a light irradiation device according to an embodiment of the present invention.

FIG. 1 shows a light irradiation device 1 according to an embodiment of the present invention. The light irradiation device 1 includes an upper frame 2 and a lower frame 3. The upper frame 2 and the lower frame 3 are rotatably coupled to each other by a hinge 4.

The upper frame 2 has a housing 21. In the housing 21, housed are a light source 22 that has, for example, one or more LEDs and configured to emit ultraviolet light, and a heatsink 23 that is in contact with the light source. The heatsink 23 is cooled by cooling water that flows through a cooling water channel 24 in order to cool the light source 22. An opening 25 for allowing the light to proceed therethrough is formed in a lower portion of the housing 21 at a position corresponding to the light source 22.

The lower frame 3 has a holding body 31 to receive and hold a concave reflection mirror 5 (will be described), and a cooling block 32 that is in contact with the holding body 31. A cooling water channel 33 is formed in the cooling block 32, and the cooling water flows through the cooling water channel 33.

Figure 2:
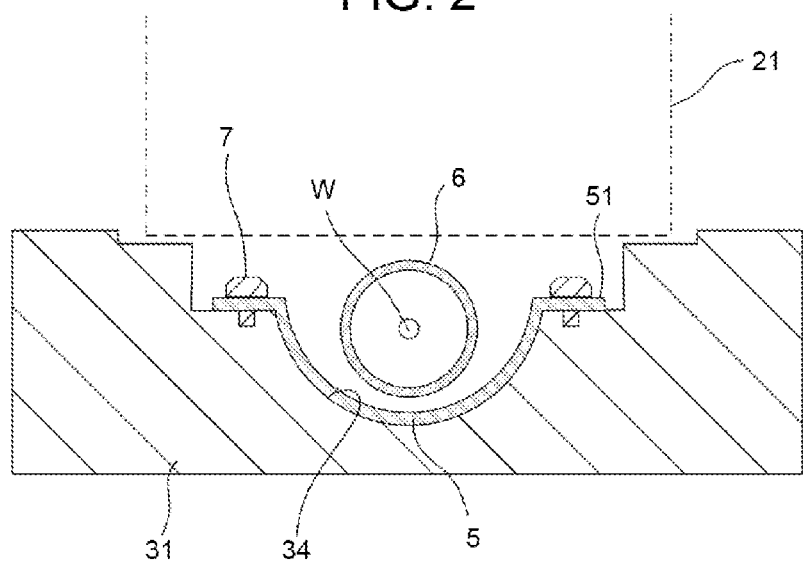
FIG. 2 illustrates a fragmentary cross-sectional view of the first embodiment.

As the details are shown in FIG. 2, the holding body 31 has a gutter-shaped concave accommodating portion 34 formed therein. The gutter-shaped concave reflection mirror 5 is in contact with and fixed to the concave accommodating portion 34.

Flange portions 51 are formed at the outer edges of the concave reflection mirror 5 such that the flange portions 51 extend horizontally. The concave reflection mirror 5 is detachably fixed on the holding body 31 by fastening the flange portions 51 with screws 7 or the like.

A protective tube 6 is arranged such that the protective tube is surrounded by the concave reflection mirror 5. The protective tube 6 transmits the ultraviolet light, and is made from, for example, silica glass (quartz glass) or the like.

A centerline area of the protective tube 6 is an insertion passage for a wire W. The wire W is a substance to be treated, and the wire W is continuously supplied along the insertion passage in the protective tube. In this embodiment, the wire W is, for example, an optical fiber and a resin coating is applied on the outer surface (peripheral surface) of the optical fiber. The resin on the surface of the optical fiber is hardened upon irradiating the optical fiber with light (ultraviolet light). It should be noted that the wire W may be a fiber, and the surface of the wire may be reformed upon irradiating the wire with light.

Referring back to FIG. 1, the light source 22 is arranged above the protective tube 6, which has the insertion passage for the wire W therein as described above, such that the light source 22 extends along the protective tube 6 and faces the protective tube 6. Below the protective tube 6, arranged is the concave reflection mirror 5 that has a gutter shape and faces the light source 22.

With such configuration, the light from the light source 22 is directly introduced to the wire W in the protective tube 6, and the wire W is irradiated with the light reflected by the concave reflection mirror 5.

Because the light irradiation device has the above-described structure, the concave reflection mirror 5 can easily be removed (detached) from the holding body 31, and the maintenance work for the concave reflection mirror and the replacement work for the concave reflection mirror become easy. Also, because the reflection mirror is fixed onto the holding body 31 with the flange portions 51, the deformation caused by the thermal expansion is forced (pushed) toward the concave accommodating portion 34. Thus, the deformation caused by the thermal expansion can be suppressed.

Figure 3:
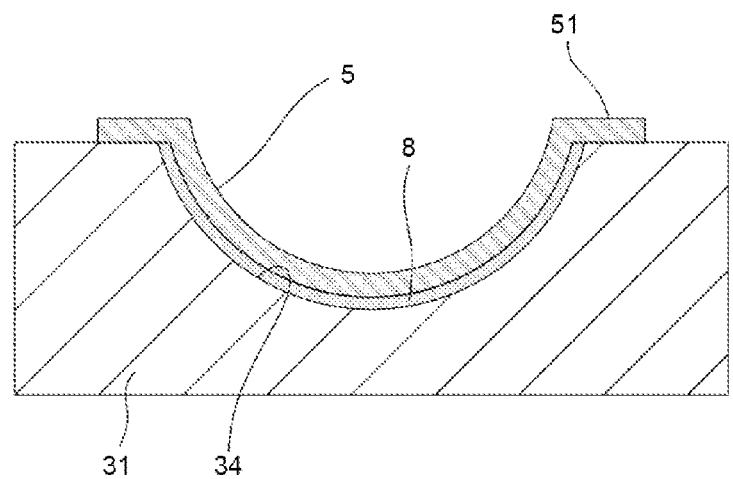
FIG. 3 is an enlarged fragmentary cross-sectional view of a second embodiment.

FIG. 3 shows a second embodiment. In this embodiment, a heat conductive sheet 8 is interposed between the concave reflection mirror 5 and the concave accommodating portion 34 of the holding body 31.

The heat conductive sheet 8 is made from a base material, such as rubber or resin, and a filler, such as ceramics, graphite or metal, dispersed in the base material. The heat conductive sheet is configured to improve the heat conduction (thermal conduction) between the concave reflection mirror 5 and the holding body 31 and enhance the cooling effect to the concave reflection mirror 5.

Figure 4:
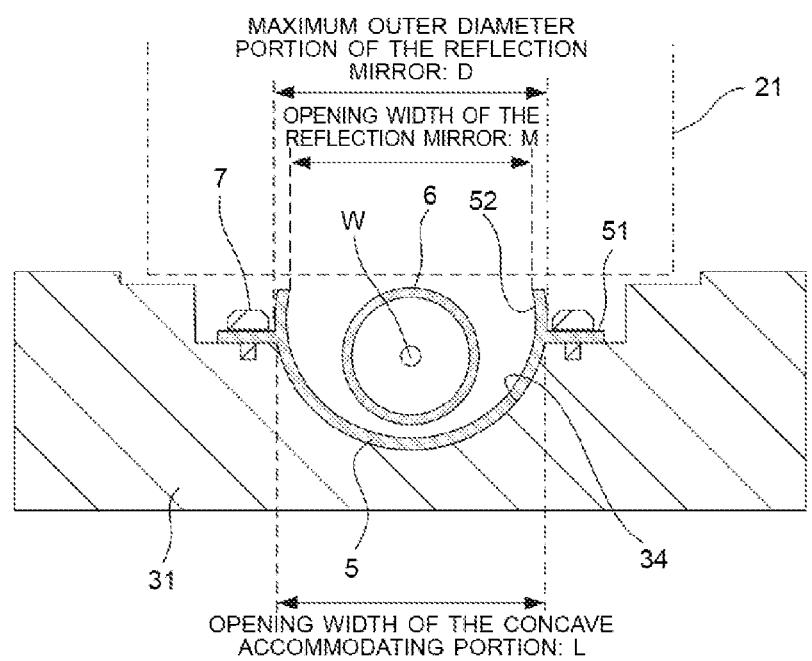
FIG. 4 is an enlarged cross-sectional view of a third embodiment.

FIG. 4 shows another embodiment, i.e., a third embodiment. The concave reflection mirror 5 has protruding portion 52 that protrude upwards from the flange portions 51. The protruding portions 52 define a maximum outer diameter portion D, which is larger than an opening width L of the concave accommodating portion 34, and the opening width M of the concave reflection mirror 5 is smaller than the maximum outer diameter portion D. The flange portions 51 are disposed below the maximum outer diameter portion D.

Because the light irradiation device has the above-described structure, the concave reflection mirror 5 contacts the concave accommodating portion 34 of the holding body 31 at a position below the maximum outer diameter portion D. Therefore, the attaching work and the detaching work for the concave reflection mirror 5 become easier.

It should be noted that although the maximum outer diameter portion D of the concave reflection mirror 5 is greater than the opening width L of the concave accommodating portion 34 and the flange portions 51 are formed below the maximum outer diameter portion D in this embodiment, the same advantages are obtained even if the maximum outer diameter portion D is reduced down to the opening width L of the concave accommodating portion 34 and the locations of the flange portions 51 are shifted to the maximum outer diameter portion D.

Figure 5:
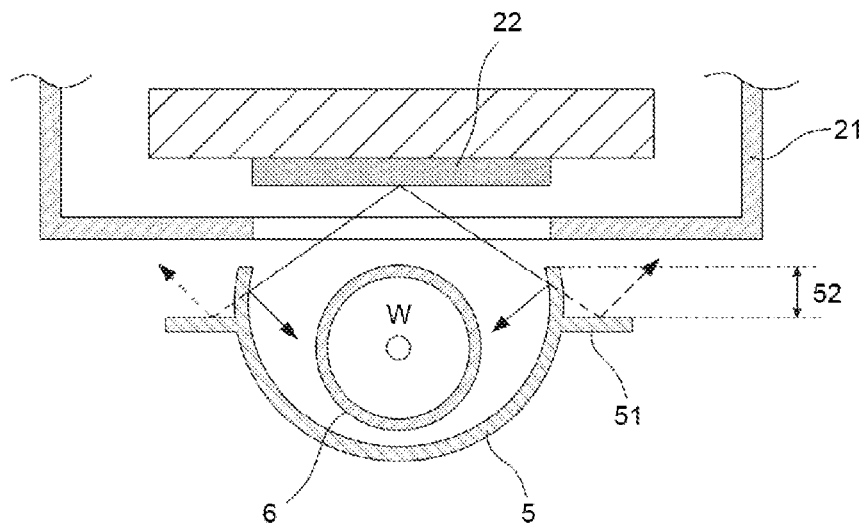
FIG. 5 is a view useful to describe functions of the third embodiment shown in FIG. 4.

As shown in FIG. 5, when the third embodiment is employed, some of the light from the light source 22 that would otherwise proceed out of the concave reflection mirror 5 as indicated by the broken lines is reflected by the protruding portions 52 as indicated by the solid lines such that the reflected light returns toward the protective tube 6 and is effectively used as the light to be directed to the wire W. The light would proceed out of the concave reflection mirror if there were no protruding portions 52, as indicated by the broken lines.

Figure 6:
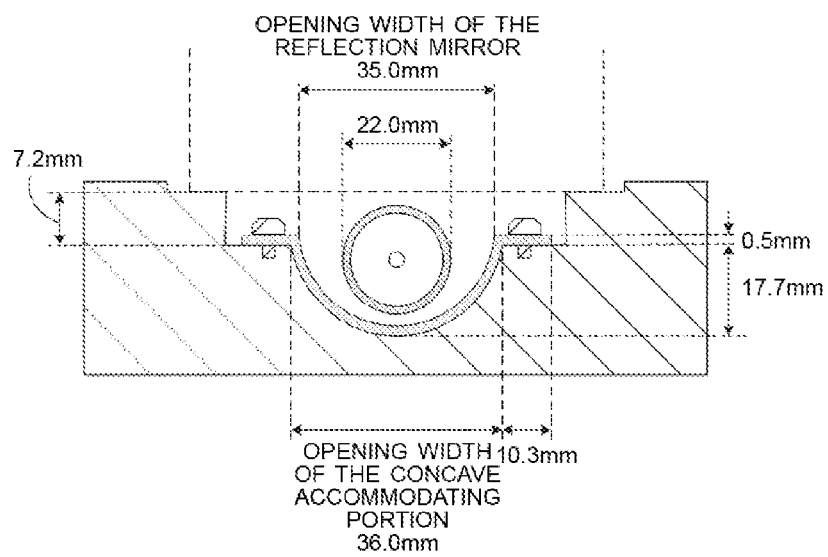
FIG. 6 shows a numerical example of the first embodiment shown in FIG. 2.

FIG. 6 shows an exemplary set of numeric values of the third embodiment.

Holding Body
　Opening width of the concave accommodating portion: 36.0 mm
　Depth of the concave accommodating portion: 17.7 mm
　Depth of the step portion: 7.2 mm
Concave Reflection Mirror
　Material: Aluminum
　Thickness: 0.5 mm
　Opening width: 35.0 mm
　Width of the flange portion: 10.3 mm
Protective Tube
　Thickness: 1 mm
　Outer diameter: 22.0 mm
Wire
　Diameter φ: 0.25 mm (original material diameter φ is 0.125 mm, and resin coating over the original material surface has a thickness of 0.0625 mm)

Figure 7:
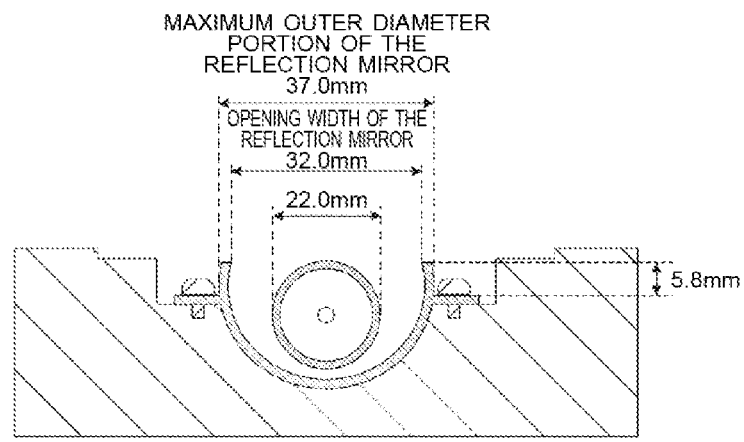
FIG. 7 shows a numerical example of the third embodiment shown in FIG. 4.
Figure 8:
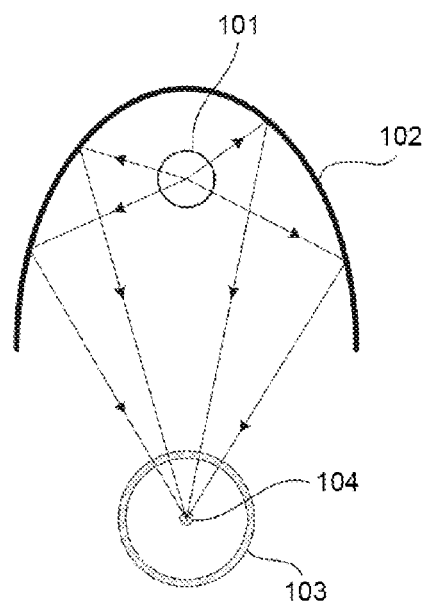
FIG. 8 shows a cross-sectional view of a conventional device.

FIG. 7 shows an exemplary set of numerical values of a fourth embodiment.

Concave Reflection Mirror
　Opening width: 32.0 mm
　Amount of protrusion of the protruding portion: 5.8 mm
　Diameter of the maximum outer diameter portion: 37.0 mm
　Other numerical values are the same as the third embodiment shown in FIG. 6.

As described above, the light irradiation device of the invention detachably fixes the concave reflection mirror, which is disposed opposite the light source across the protective tube such that the concave reflection mirror faces the light source, to the concave accommodating portion of the holding body with the flange portions extending from the concave reflection mirror. Thus, the present invention provides advantages, i.e., the removal (detaching) of the concave reflection mirror becomes easy, and the deformation due to the thermal expansion is suppressed by the fixing of the concave reflection mirror with the flange portions.

REFERENCE NUMERALS AND SYMBOLS

1: Light irradiation device
2: Upper frame
21: Housing
22: Light source (LEDs)
23: Heatsink
3: Lower frame
31: Holding body
32: Cooling block
34: Concave accommodating portion
4: Hinge
5: Concave reflection mirror
51: Flange portion
52: Protruding portion
6: Protective tube
8: Heat conductive sheet
W: Wire
D: Maximum outer diameter portion (of the concave reflection mirror)
L: Opening width (of the concave accommodating portion)

The invention claimed is:

1. A light irradiation device comprising:
    a protective tube that has an insertion passage for a wire therein;
    a light source arranged above and along the protective tube such that the light source faces the protective tube; and
    a concave reflection mirror that faces the light source and is disposed below the protective tube, the concave reflection mirror having a gutter shape,
    the concave reflection mirror being received in a concave accommodating portion formed in a holding body, the concave accommodating portion having a gutter shape, and the concave reflection mirror having flange portions that extend horizontally from an outer surface of the concave reflection mirror, and
    the concave reflection mirror being detachably fixed to the holding body with the flange portions, wherein the reflection mirror has protruding portions that protrude upward beyond the flange portions, and the protruding portions reflect the light, which is emitted from the light source, toward the protective tube.

2. The light irradiation device according to claim 1, wherein the protruding portions of the reflection mirror define a maximum outer diameter portion that is greater than an opening width of the concave accommodating portion, and
    the flange portions are formed below the maximum outer diameter portion.

3. The light irradiation device according to claim 1 further comprising a heat conductive sheet disposed between the reflection mirror and the holding body.

4. The light irradiation device according to claim 2 further comprising a heat conductive sheet disposed between the reflection mirror and the holding body.

* * * * *